(12) United States Patent
Bareaud

(10) Patent No.: US 12,249,824 B2
(45) Date of Patent: Mar. 11, 2025

(54) DC ELECTRICAL NETWORK AND OVERCURRENT PROTECTION SYSTEM FOR A DC ELECTRICAL NETWORK

(71) Applicant: Airbus Operations SAS, Toulouse (FR)

(72) Inventor: Patrick Bareaud, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 219 days.

(21) Appl. No.: 17/990,928

(22) Filed: Nov. 21, 2022

(65) Prior Publication Data

US 2023/0163586 A1 May 25, 2023

(30) Foreign Application Priority Data

Nov. 24, 2021 (FR) ...................................... 2112437

(51) Int. Cl.
*H02H 3/00* (2006.01)
*H02H 1/00* (2006.01)
*H02H 3/08* (2006.01)

(52) U.S. Cl.
CPC ............ *H02H 3/08* (2013.01); *H02H 1/0007* (2013.01); *B64D 2221/00* (2013.01)

(58) Field of Classification Search
None
See application file for complete search history.

(56) References Cited

U.S. PATENT DOCUMENTS

| 3,947,748 A | * | 3/1976 | Klein | ................... | H02H 7/1225 |
| | | | | | 363/57 |
| 4,631,621 A | * | 12/1986 | Howell | ................... | H01H 9/542 |
| | | | | | 361/13 |
| 2007/0159745 A1 | | 7/2007 | Berberich et al. | | |
| 2009/0021874 A1 | | 1/2009 | Divito et al. | | |
| 2021/0249854 A1 | | 8/2021 | Rupp | | |

FOREIGN PATENT DOCUMENTS

DE 102018201546 A1 8/2019

OTHER PUBLICATIONS

French Search Report dated Jul. 8, 2022; priority document.

* cited by examiner

*Primary Examiner* — Stephen W Jackson
(74) *Attorney, Agent, or Firm* — Greer, Burns & Crain, Ltd.

(57) ABSTRACT

The DC electrical network comprises an electrical load supplied with electricity by an electrical power source to which the electrical load is linked by a first electrical line and a second electrical line. An overcurrent protection system comprising an input pole and an output pole is mounted in series on the first electrical line. The overcurrent protection system comprises an electronic switch mounted in series between the input pole and the output pole, an electrical current sensor, and a controller configured to control the electronic switch. It also comprises an electronic device linked to the input pole and to the second electrical line. The controller is configured to command a conducting state of the electronic device when a current measurement from the electrical current sensor is above a predetermined current threshold, then to command an opening of the electronic switch.

9 Claims, 3 Drawing Sheets

DC ELECTRICAL NETWORK AND OVERCURRENT PROTECTION SYSTEM FOR A DC ELECTRICAL NETWORK

CROSS-REFERENCES TO RELATED APPLICATIONS

This application claims the benefit of the French patent application No. 2112437 filed on Nov. 24, 2021, the entire disclosures of which are incorporated herein by way of reference.

FIELD OF THE INVENTION

The invention relates to the field of DC electrical networks, in particular the electrical networks of high-voltage type, embedded on board aircraft.

BACKGROUND OF THE INVENTION

Aircraft increasingly use embedded electrical systems, which leads to increasingly higher embedded electrical power needs. For that, there is a trend to use increasingly higher electrical voltage levels, in particular DC current levels. Thus, some modern aircraft comprise a high-voltage DC electrical network, also called HVDC ("high-voltage direct current"). An HVDC electrical network such as this uses, for example, electrical voltage levels of +270 V or −270 V, or even +540 V. The electrical network is used to power electrical loads, such as, for example, actuators, motors, pumps, etc., from at least one high-voltage DC electrical source. The electrical loads are linked to the electrical source by electrical lines. In order to protect the electrical lines and the electrical power supply against an electrical fault (for example, a short-circuit) that might occur on the electrical loads or in proximity to the electrical loads, at least a part of the electrical lines must be equipped with overcurrent protection systems. For example, the electrical lines linked to a positive pole of the electrical power supply can be equipped with such overcurrent protection systems. In the case of an HVDC electrical network, given the voltage levels, a short-circuit current circulating in such an overcurrent protection system can reach a very high intensity. That makes interrupting such a current by the overcurrent protection system all the more difficult. Consequently, there is a need for an overcurrent protection system that makes it possible to stop a current of very high intensity, without the risk of destroying the overcurrent protection system.

SUMMARY OF THE INVENTION

The present invention notably aims to provide a solution to this problem. It relates to a DC electrical network provided to supply electricity to an electrical load by an electrical power source, the electrical network comprising:
the electrical power source, comprising a first pole and a second pole; and
the electrical load, comprising a first pole and a second pole;
a first electrical line linking the first pole of the electrical load to the first pole of the electrical power source;
a second electrical line linking the second pole of the electrical load to the second pole of the electrical power source;
an overcurrent protection system mounted in series on the first electrical line, the overcurrent protection system comprising an input pole linked to the first pole of the electrical power source by an upstream part of the first electrical line and an output pole linked to the first pole of the electrical load by a downstream part of the first electrical line, wherein the overcurrent protection system comprises an electronic switch mounted in series between the input pole and the output pole, an electrical current sensor provided to measure an electrical current circulating between the input pole and the output pole, and a controller configured to control the electronic switch.

The electrical network is noteworthy in that the overcurrent protection system comprises an electronic device comprising a first pole linked to the input pole of the overcurrent protection system and a second pole linked to the second electrical line, this electronic device being designed to present a non-conducting state in normal operation and a conducting state when a command is applied to it, and in that the controller is configured to:
acquire an electrical current measurement from the electrical current sensor;
compare the current measurement to a predetermined current threshold; and
when the current measurement is above the predetermined current threshold, apply a command to the electronic device so as to command its conducting state, then command an opening of the electronic switch.

Thus, when an overcurrent occurs in the first electrical line, the overcurrent protection system begins by commanding a conducting state of its electronic device, which has the effect of causing the circulation of a very high current between the first electrical line, upstream of the electronic switch, and the second electrical line via the electronic device. The result thereof is a significant reduction of the voltage on the first electrical line upstream of the electronic switch and consequently a significant reduction of the current passing through the electronic switch, such that this current can be easily interrupted upon the closure of the electronic switch, without the risk of damaging the electronic switch.

In a particular embodiment, the electronic device comprises a discharge tube. In particular, the controller is configured to apply the command to the electronic device by commanding the application, between two poles of the discharge tube, of a voltage greater than a discharge tube trigger voltage. Advantageously, one of the poles of the discharge tube is linked to the input pole of the protection system via a diode.

According to a first alternative, the controller is configured to command the opening of the electronic switch after a predetermined time after having applied the command to the electronic device. According to another alternative, the controller is configured to command the opening of the electronic switch after having applied the command to the electronic device, when an electrical current measurement measured by the electrical current sensor is below a second predetermined current threshold.

In one embodiment, the controller is configured to stop the application of the command to the electronic device after having commanded the opening of the electronic switch.

In an advantageous embodiment, the controller is configured to receive a reset command and to command a closing of the electronic switch in response to a reception of a reset command.

The invention also relates to an aircraft comprising such a DC electrical network.

The invention also relates to an overcurrent protection system for a DC electrical network provided to supply electricity to an electrical load by an electrical power source, the electrical power source comprising a first pole and a second pole and the electrical load comprising a first pole and a second pole, the DC electrical network being designed in such a way that the first pole of the electrical load is linked to the first pole of the electrical power source by a first electrical line and the second pole of the electrical load is linked to the second pole of the electrical power source by a second electrical line, the overcurrent protection system being provided to be mounted in series on the first electrical line and comprising an input pole provided to be linked to the first pole of the electrical power source by an upstream part of the first electrical line and an output pole provided to be linked to the first pole of the electrical load by a downstream part of the first electrical line, and the overcurrent protection system comprising an electronic switch mounted in series between the input pole and the output pole, an electrical current sensor provided to measure an electrical current circulating between the input pole and the output pole, and a controller configured to control the electronic switch.

The overcurrent protection system is noteworthy in that it comprises an electronic device comprising a first pole linked to the input pole of the overcurrent protection system and a second pole provided to be linked to the second electrical line, this electronic device being designed to present a non-conducting state in normal operation and a conducting state when a command is applied to it, and in that the controller is configured to:

acquire an electrical current measurement from the electrical current sensor;
compare the current measurement to a predetermined current threshold; and
when the current measurement is above the predetermined current threshold, apply a command to the electronic device so as to command its conducting state, then command an opening of the electronic switch.

BRIEF DESCRIPTION OF THE DRAWINGS

The invention will be better understood on reading the following description and studying the attached figures.

DETAILED DESCRIPTION OF THE PREFERRED EMBODIMENTS

Figure 1:
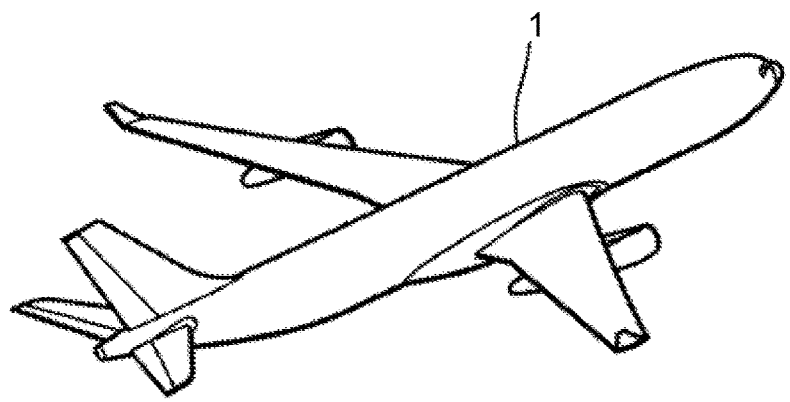
FIG. 1 illustrates an aircraft equipped with an electrical network according to an embodiment of the invention.
Figure 2:
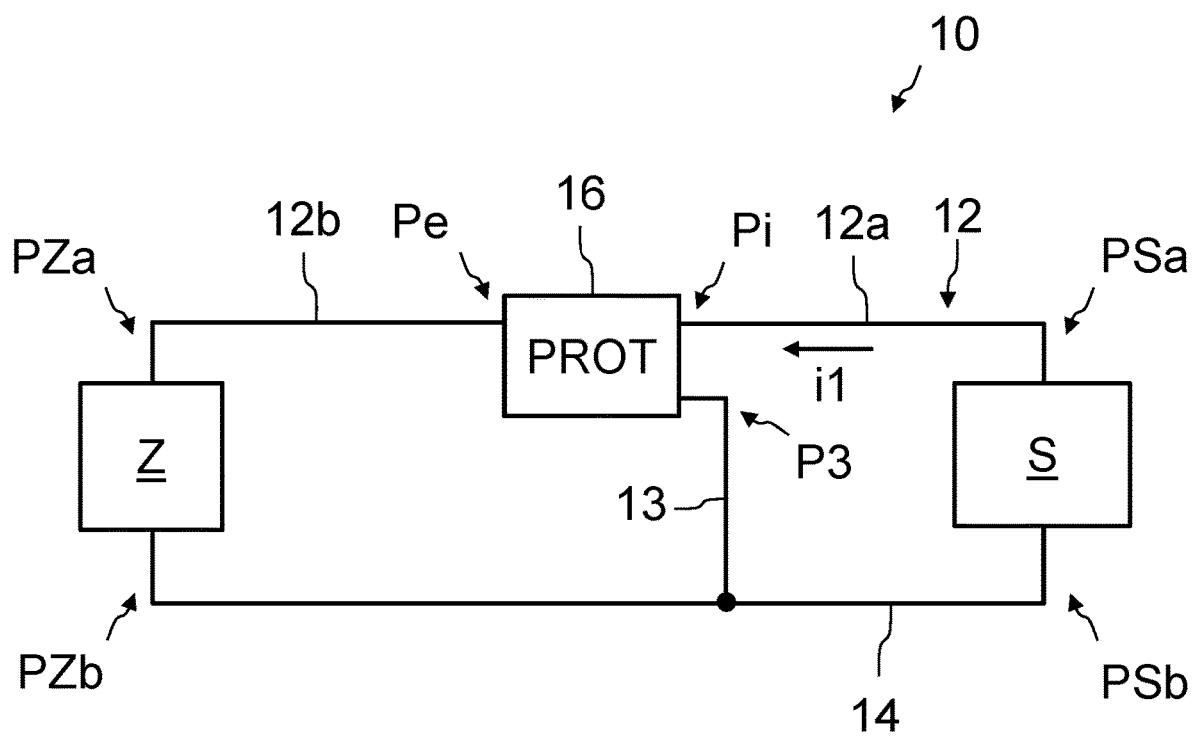
FIG. 2 schematically illustrates an electrical network of an aircraft according to an embodiment of the invention.

The electrical network 10 represented in FIG. 2 corresponds to an electrical network of an aircraft such as the aircraft 1 illustrated in FIG. 1. This electrical network comprises an electrical power source S comprising a first pole PSa and a second pole PSb, and an electrical load Z comprising a first pole PZa and a second pole PZb. The electrical network also comprises a first electrical line 12 linking the first pole PZa of the electrical load Z to the first pole PSa of the electrical power source S, and a second electrical line 14 linking the second pole PZb of the electrical load Z to the second pole PSb of the electrical power source S, so as to allow the load Z to be electrically powered by the electrical power source S. The electrical network 10 further comprises an overcurrent protection system 16 (labelled "PROT" in the figure) mounted in series on the first electrical line 12. This overcurrent protection system 16 comprises an input pole Pi linked to the first pole PSa of the electrical power source S by an upstream part 12a of the first electrical line 12, and an output pole Pe linked to the first pole PZa of the electrical load Z by a downstream part 12b of the first electrical line 12. In operation, the electrical power source S supplies, at the output of its first pole PSa, a current i1 which circulates over the link 12a.

Figure 3:
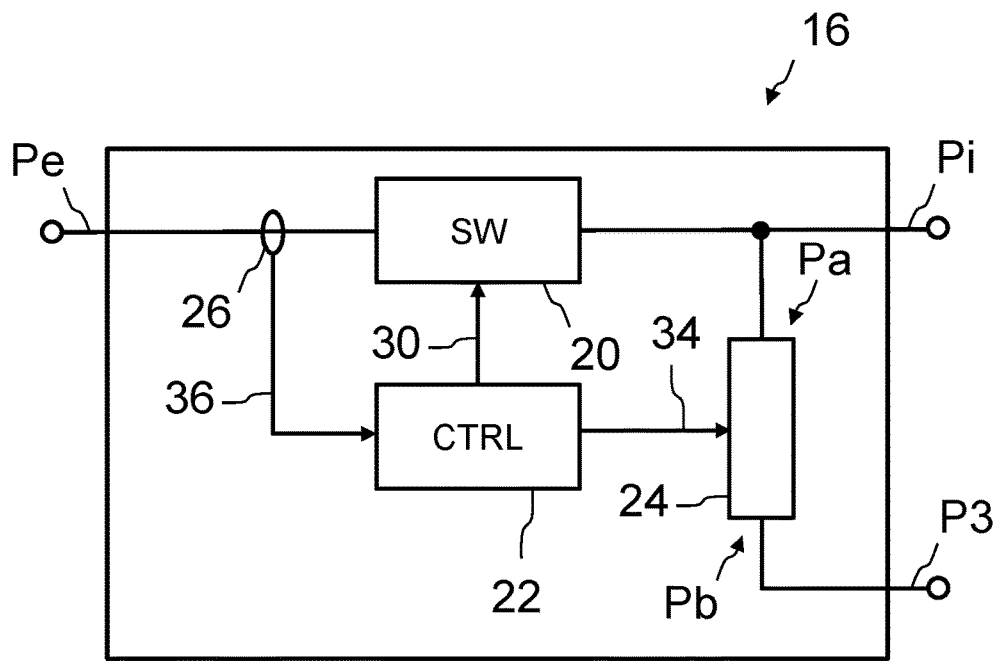
FIG. 3 schematically illustrates an overcurrent protection system of the electrical network of FIG. 2.

As illustrated in FIG. 3, the overcurrent protection system 16 comprises an electronic switch 20 (labelled "SW" in the figure) mounted in series on a link between the input pole Pi and the output pole Pe. The electronic switch 20 corresponds, for example, to a transistor of IGBT type or of MOSFET type. The overcurrent protection system 16 also comprises an electrical current sensor 26 provided to measure an electrical current circulating between the input pole Pi and the output pole Pe, and a controller 22 (labelled "CTRL" in the figure) configured to control the electronic switch 20 via a link 30. The overcurrent protection system 16 further comprises an electronic device 24 comprising a first pole Pa linked to the input pole Pi of the overcurrent protection system 16 and a second pole Pb linked to a pole P3 of the overcurrent protection system 16, linked to the second electrical line 14 by an electrical link 13. The electronic device 24 is designed to present a non-conducting state in normal operation and a conducting state when a command is applied to it by the controller 22 via a link 34. In the conducting state, the electronic device 24 behaves as an impedance of very low value, for example an impedance lower than 0.1 ohm.

The controller 22 is configured in such a way that, in operation, it implements the following steps:
repetitively acquiring an electrical current measurement from the electrical current sensor 26;
comparing the current measurement to a predetermined current threshold; and
when the current measurement is above the predetermined current threshold, applying a command to the electronic device 24 so as to command its conducting state, then commanding an opening of the electronic switch 20.

The commanding of the conducting state of the electronic device 24 has the effect of causing a significant reduction of the voltage at the input pole Pi of the overcurrent protection system 16, since the electronic device then behaves almost as a short-circuit between the pole Pi and the pole P3, not counting the internal resistance of the electronic device 24. This reduction of the voltage at the input pole Pi has the effect of reducing the voltage between the input pole Pi and the output pole Pe and therefore of very significantly reducing the electrical current circulating on the link between these two poles, therefore in the electronic switch 20. Consequently, when the controller 22 commands the opening of the electronic switch 20, the intensity of the current in the electronic switch 20 is sufficiently reduced to make it possible to perform the opening without the risk of damaging the electronic switch 20.

According to a first alternative, the controller 22 commands the opening of the electronic switch 20 after a predetermined time after having applied the command to the electronic device 24. According to a second alternative, after having applied the command to the electronic device 24, the controller 22 repetitively acquires a current measurement measured by the electrical current sensor 26. When an electrical current measurement is below a second predetermined current threshold, the controller commands the opening of the electronic switch 20.

Advantageously, the controller 22 stops the application of the commanding of the conducting state of the electronic device 24 after having commanded the opening of the electronic switch 20.

In one embodiment, the controller 22 is powered by the electrical power source S to which it is linked. In another embodiment, the controller 22 is powered electrically by another electrical source, independent of the electrical source S. That makes it possible to guarantee the operation of the overcurrent protection system 16, even when the electrical network 10 is started up. In particular, this other electrical source is a low-voltage source, for example delivering a voltage of 28 volts in direct current.

Figure 4:
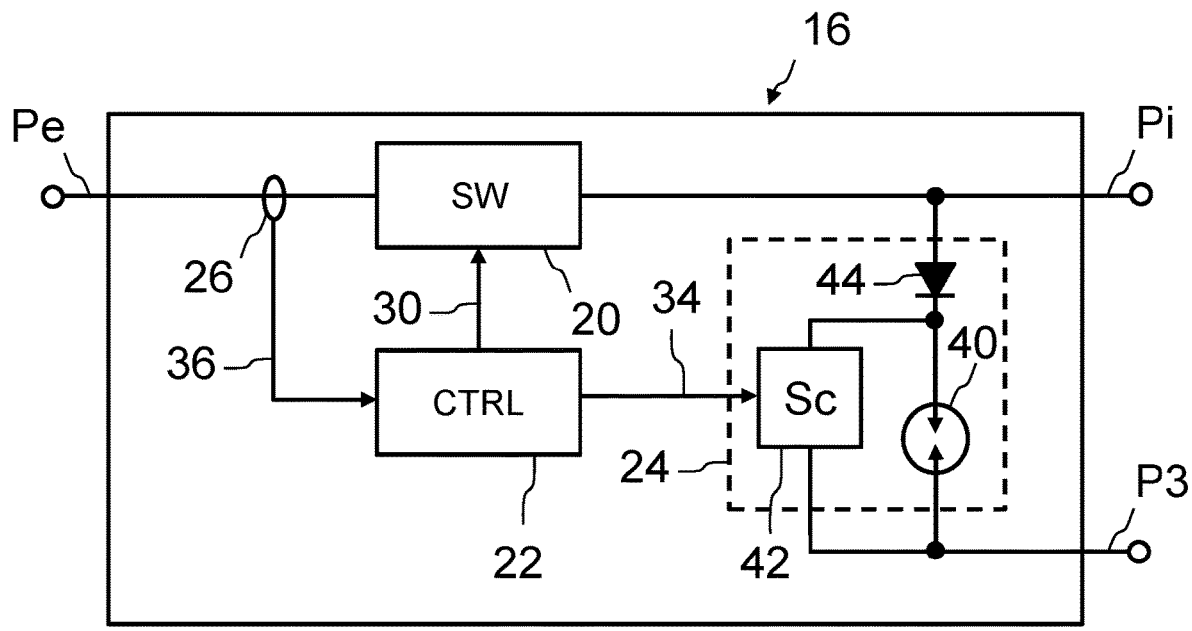
FIG. 4 schematically illustrates a particular embodiment of the overcurrent protection system of FIG. 3.

In a particular embodiment illustrated in FIG. 4, the electronic device 24 comprises a discharge tube 40. A discharge tube is an airtight tube containing a pair of electrodes and filled with a gas which is conductive only when a voltage above a trigger voltage of the discharge tube is applied to the electrodes. When a voltage spike appears in the circuit, the gas is ionized and becomes a conducting gas plasma, which short-circuits the energy spike corresponding to this voltage spike. The discharge tubes are often used to protect inputs of sensitive circuits against disturbing transient voltages, notably for lightning protection. Such a discharge tube is sometimes also called a gas-filled spark gap. The electronic device 24 also comprises an electrical power source 42 (labelled "Sc" in the figure), controlled by the controller 22 via the link 34. The electrical power source 42 is linked to two poles of the discharge tube 40 corresponding to its electrodes. This electrical power source is inactive when it is not being controlled by the controller 22 and it is configured to supply as output a voltage greater than the trigger voltage of the discharge tube 40 when it is commanded by the controller 22. Thus, when the controller 22 sends a command to the electrical power source 42 via the link 34, the electrical power source 42 applies, to the terminals of the discharge tube, a voltage greater than the discharge tube trigger voltage. Consequently, that has the effect of commanding the conducting state of the discharge tube 40. Advantageously, the electronic device 24 further comprises a diode 44 mounted in series with the discharge tube, between a pole of the discharge tube and the input pole Pi of the overcurrent protection system 16. That makes it possible to avoid propagating in the electrical network a voltage from the electrical power source 42.

In one embodiment, the controller 22 comprises an input provided to receive a reset command According to a first alternative, this input is provided to receive an on-off signal or an analogue signal. According to a second alternative, this input corresponds to a communication line provided to communicate with a computer of the aircraft. When it receives a reset command via this input, the controller 22 commands a closure of the electronic switch 20. Thus, after a triggering of the overcurrent protection system 16 (having led to an opening of the electronic switch 20), following an overcurrent on the electrical link 12 between the electrical source S and the electrical load Z, it is possible to send a command to the controller 22 to restore the electrical powering of the electrical load Z by the electrical power source S (the controller 22 then commanding the closure of the electronic switch 20). Advantageously, when the input corresponds to a communication line, this communication line further allows the controller 22 to inform the computer of the aircraft of a triggering of the overcurrent protection system 16. This computer can thus inform a crew member or maintenance personnel of the existence of a fault on the electrical network 10 of the aircraft.

Figure 5:
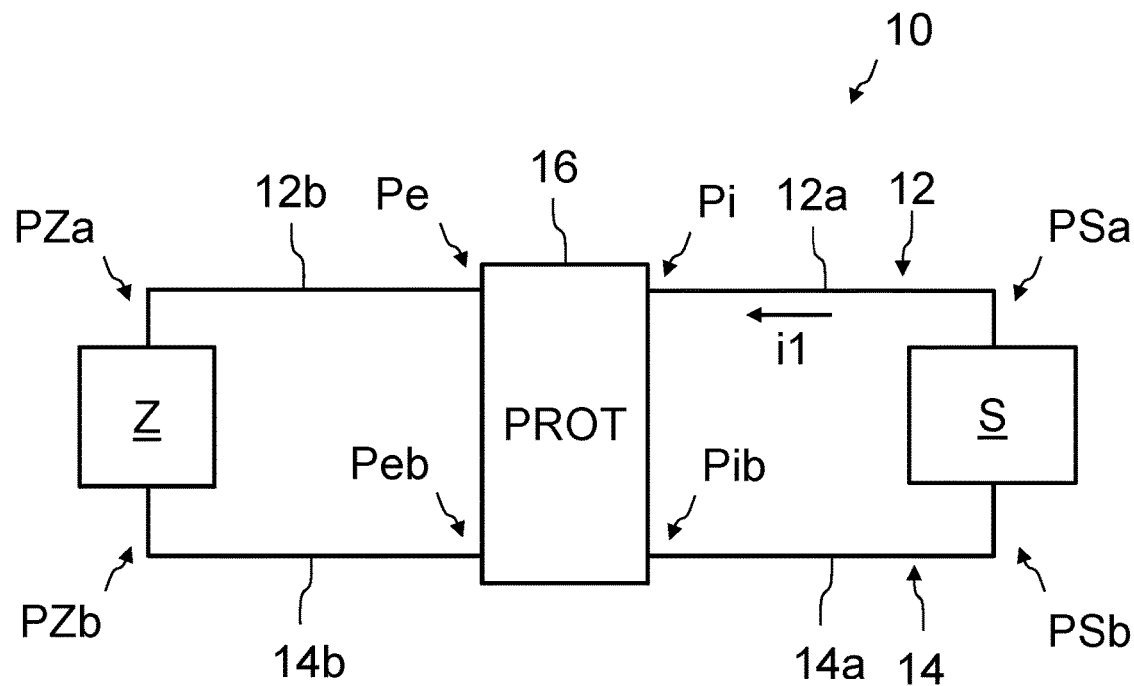
FIG. 5 schematically illustrates an electrical network of an aircraft according to another embodiment of the invention.
Figure 6:
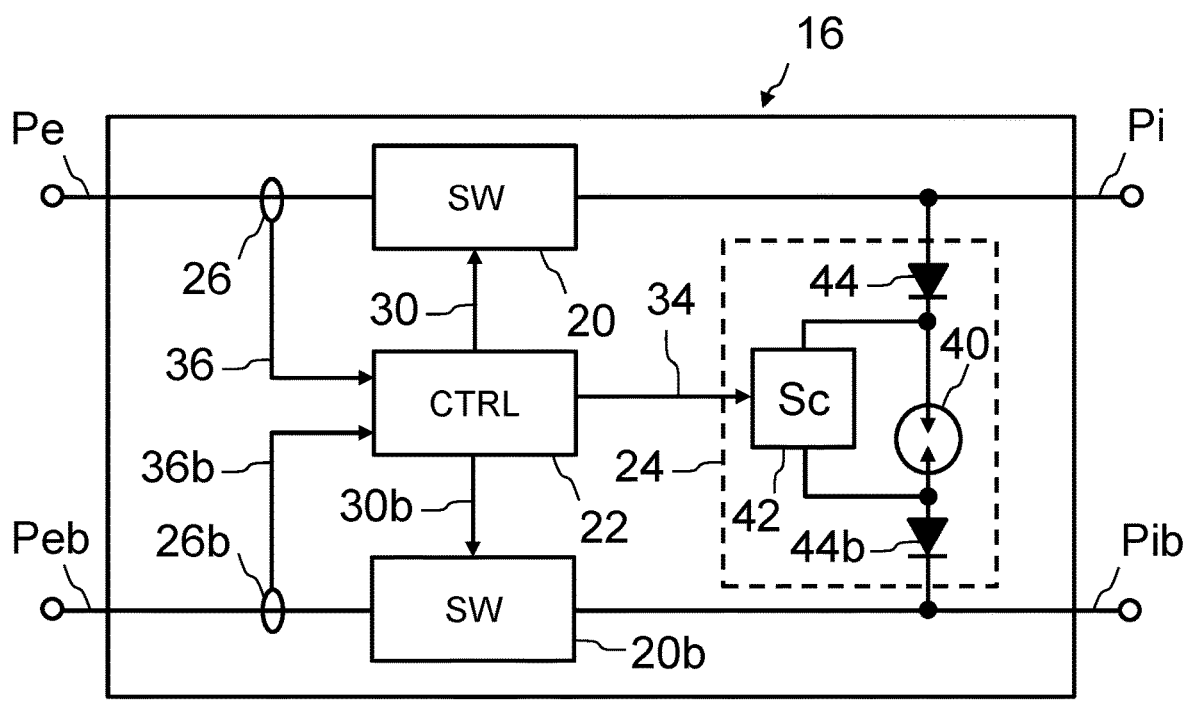
FIG. 6 schematically illustrates an overcurrent protection system of the electrical network of FIG. 5.

In a particular embodiment illustrated in FIG. 5, the overcurrent protection system 16 is also mounted in series on the second electrical link 14. The overcurrent protection system 16 then comprises a pole Pib linked to the second pole PSb of the electrical power source S by a first part 14a of the second electrical link 14, and a pole Peb linked to the second pole PZb of the electrical load Z by a second part 14b of the second electrical link 14. The operation of the overcurrent protection system 16 with respect to the second electrical link 14 is similar to that already described for the first electrical link 12. The overcurrent protection system 16 thus makes it possible to protect both the first electrical link 12 and the second electrical link 14 against overcurrents that might occur on these electrical links. As illustrated in FIG. 6, when the overcurrent protection system 16 corresponds to the particular embodiment already described with relation to FIG. 4, the overcurrent protection system 16 further comprises a second electronic switch 20b mounted in series on a link between the poles Peb and Pib and a second current sensor 26b linked to the controller 22 by a link 36b. The controller 22 is further configured to control the electronic switch 20b via a link 30b. Advantageously, although not obligatorily, the overcurrent protection system 16 comprises a second diode 44b mounted in series on a link between a second pole of the discharge tube 40 and the pole Pib.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A DC electrical network provided to supply electricity to an electrical load by an electrical power source, the electrical network comprising:
    said electrical power source, comprising a first pole and a second pole; and
    said electrical load, comprising a first pole and a second pole;
    a first electrical line linking the first pole of the electrical load to the first pole of the electrical power source;
    a second electrical line linking the second pole of the electrical load to the second pole of the electrical power source;
    an overcurrent protection system mounted in series on the first electrical line, the overcurrent protection system comprising
        an input pole linked to the first pole of the electrical power source by an upstream part of the first electrical line, and an output pole linked to the first pole of the electrical load by a downstream part of the first electrical line,
wherein the overcurrent protection system comprises
an electronic switch mounted in series between the input pole and the output pole,
an electrical current sensor provided to measure an electrical current circulating between the input pole and the output pole, and
a controller configured to control the electronic switch,
wherein the overcurrent protection system comprises an electronic device comprising a first pole linked to the input pole of the overcurrent protection system and a second pole linked to the second electrical line, this electronic device being designed to present a non-conducting state in normal operation and a conducting state when a command is applied to it, wherein the electronic device comprises a discharge tube, and
wherein the controller is configured to:
acquire an electrical current measurement from the electrical current sensor;
compare the current measurement to a predetermined current threshold; and
when the current measurement is above the predetermined current threshold, apply a command to the electronic device to command its conducting state, then command an opening of the electronic switch.

2. The DC electrical network according to claim 1, wherein the controller is configured to apply said command to the electronic device by commanding an application, between two poles of the discharge tube, of a voltage greater than a discharge tube trigger voltage.

3. The DC electrical network according to claim 1, wherein one of the poles of the discharge tube is linked to the input pole of the protection system via a diode.

4. The DC electrical network according to claim 1, wherein the controller is configured to issue a command to open of the electronic switch after a predetermined time after having applied the command to the electronic device.

5. The DC electrical network according to claim 1, wherein the controller is configured to issue a command to open electronic switch after having applied the command to the electronic device, when an electrical current measurement measured by the electrical current sensor is below a second predetermined current threshold.

6. The DC electrical network according to claim 1, wherein the controller is configured to stop the application of the command to the electronic device after having commanded the opening of the electronic switch.

7. The DC electrical network according to claim 1, wherein the controller is configured to receive a reset command and to command a closing of the electronic switch in response to a reception of a reset command.

8. An aircraft, comprising the DC electrical network according to claim 1.

9. An overcurrent protection system for a DC electrical network provided to supply electricity to an electrical load by an electrical power source, the electrical power source comprising a first pole and a second pole and the electrical load comprising a first pole and a second pole,
the DC electrical network being configured such that the first pole of the electrical load is linked to the first pole of the electrical power source by a first electrical line and the second pole of the electrical load is linked to the second pole of the electrical power source by a second electrical line,
the overcurrent protection system being configured to be mounted in series on the first electrical line and comprising an input pole configured to be linked to the first pole of the electrical power source by an upstream part of the first electrical line and an output pole configured to be linked to the first pole of the electrical load by a downstream part of the first electrical line,
the overcurrent protection system comprising
an electronic switch mounted in series between the input pole and the output pole,
an electrical current sensor configured to measure an electrical current circulating between the input pole and the output pole, and
a controller configured to control the electronic switch,
the overcurrent protection system comprising an electronic device comprising a first pole linked to the input pole of the overcurrent protection system and a second pole provided to be linked to the second electrical line, the electronic device being configured to present a non-conducting state in normal operation and a conducting state when a command is applied to it, wherein the electronic device comprises a discharge tube, and
wherein the controller is configured to:
acquire an electrical current measurement from the electrical current sensor;
compare the current measurement to a predetermined current threshold; and
when the current measurement is above the predetermined current threshold, apply a command to the electronic device so as to command its conducting state, then command an opening of the electronic switch.

* * * * *